United States Patent [19]

Blanie et al.

[11] Patent Number: 4,551,341
[45] Date of Patent: Nov. 5, 1985

[54] METHOD FOR OBTAINING CLEAR PLANT JUICES AND FOR THE RECOVERY OF VALORIZABLE CONSTITUENTS

[76] Inventors: Paul Blanie, 282, rue Saint Jacques, 75005 Paris; Claude Vernier, 15, rue du Louvre, 75001 Paris; Yves Vrignaud, 5, avenue de Rivoli, 92190, Meudon, all of France

[21] Appl. No.: 373,483
[22] PCT Filed: Aug. 10, 1981
[86] PCT No.: PCT/FR81/00098
§ 371 Date: Apr. 13, 1982
§ 102(e) Date: Apr. 13, 1982
[87] PCT Pub. No.: WO82/00569
PCT Pub. Date: Mar. 4, 1982
[51] Int. Cl.$^4$ ............................................ B01D 13/00
[52] U.S. Cl. ................... 426/489; 210/651; 426/495
[58] Field of Search ............... 426/490, 495, 599, 489; 210/651

[56] References Cited

U.S. PATENT DOCUMENTS

| 3,799,806 | 3/1974 | Madsen | 210/651 |
| 4,083,779 | 4/1978 | Combe et al. | 426/495 |
| 4,115,147 | 9/1978 | Shimizu et al. | 210/651 |

FOREIGN PATENT DOCUMENTS

| 2443216 | of 0000 | France . |
| 2202655 | of 0000 | France . |
| 1324031 | of 0000 | United Kingdom . |
| 190143 | of 0000 | United Kingdom . |

OTHER PUBLICATIONS

Landi et al., abstract 60379h, Chemical Abstracts, vol. 85, p. 176 (1975).
Porter et al., Chem. Tech., pp. 633–637, (Oct. 1971).
Michaels, Ultrafiltration, published by the Amicon Corp., Lexington, Mass., Mar. 1968, (pp. 1–27).

*Primary Examiner*—George Yeung
*Attorney, Agent, or Firm*—Banner, Birch, McKie & Beckett

[57] ABSTRACT

Method for obtaining clear plant juices and for the recovery of valorizable constituents wherein the juice from the pressing is subjected to a plurality of ultrafiltration stages, of which at least one is effected on a membrane with a molecular cutoff point on the order of 15,000 to 25,000. The temperature of introduction of raw juices is adjusted to $T° C. = -6 PH + 80° C. \pm 3° C$. Clear juices and valorizable constituents are obtained by this process. Application to the production of fruit and vegetable juices with preservation of the pigmentation is also disclosed.

7 Claims, No Drawings

METHOD FOR OBTAINING CLEAR PLANT JUICES AND FOR THE RECOVERY OF VALORIZABLE CONSTITUENTS

The present invention has the object of providing processes for the treatment of plants and particularly of fruits and vegetables, one part of which relating to extraction of juices, primarily nourishing juices, and/or colorants, and another part relating to recovery of diverse materials, and in particular the pectins. The present invention equally has the object of providing the products obtained by these processes.

In the prior art, it has been known for a long time to extract the juice of fruits and vegetables, and it is not possible to summarize this evolution. Meanwhile, below is indicated the process which is actually the most prevalent and most recent, for example for apple juice. It consists essentially in the following phases:

1. pressing to separate the juice and pulp
2. pasteurization at about 80° C.
3. storage with the action of depectination enzymes at about 40° C.
4. recooling to about 15° C.
5. clarification with gelatin and bentonite
6. decantation
7. clarification by separation centrifuge (the liquid sediments are sent to filtration)
8. filtration through Kieselguhr of the clarified juices
9. filtration through a filter-press
10. pasteurization near 80° C.
11. concentration in an evaporator Such a sequence of operations takes between 28 and 36 hours on the average and consumes a great quantity of energy, notably because of the two pasteurizations which are separated by a series of treatments at temperatures clearly lower. Moreover, one consumes, by such procedures, a quantity of adjuvants both of filtration and otherwise which is not negligible.

It was therefore important to find a process which is more economical and more rapid but equally, as will be seen in the description to follow, reducing the quantities of unusable wastes.

The process conforming to the present invention, by the fact of the considerable reduction of the duration of the operations, permits work which may be either continuous or not. Notably, one can stop the operations on Sunday and on holidays because one must no longer proceed by vat work necessarily of long duration.

Elsewhere, two of the undersigned are holders of rights of the French patent application filed on Dec. 4, 1978, No. 78/34063, entitled: "Process for Clarification of Apple Juice and Analogs with Recovery of Concentrated Pectin."

In that application, apple juice is treated by two successive ultrafiltrations separated by a water addition, the pressed juice being at a temperature of between 50° and 55° C. and of which the pH is between 3.5 and 4.

The treatment there was carried out on membrane surfaces of 150 and 50 m$^2$. Now, experience has shown that in spite of these very important advantages with regard to the prior art, this procedure presented some imperfections indeed, inconveniences for which the present invention provides a remedy.

In the patent application referred to above one is led to add water. Now, not only does this addition of water often get in the way of the quality of the final product but even more, many laws forbid its employment.

However, prescribed limits of temperatures and of pH can be in fact clearly enough exceeded in practice according to the measure where one lowers the temperature by the measured pH, that is to say where one has the tendency to reduce the temperature when the pH increases and vice versa.

However, as will be seen further on, the levels of cutoff for ultrafiltration membranes giving the best results have been defined in a precise fashion.

Beyond the improvements brought forth by reference to the prior French patent application, the process conforming to the present invention presents great advantages with reference to other prior art techniques and notably permits considerable reduction of the duration of the operations of the work, whether continuous or not.

Moreover, in many cases, one looks to preserve the original pigmentation of the plant. Now, this pigmentation is generally in large part reduced by the heat treatments such as the pasteurizations, each one of which reduces the pigmentation by 15 to 20% in most cases, by the aging and the agitation treatments which produce oxidations and color changes. It is emphasized that in many well-known cases, Maillard reactions owing to the temperature and the aging produce denaturations of the products and their colors.

The present invention as will be seen in the description to follow, permits these great inconveniences of prior processes to be avoided.

The present process also presents other advantages which will be noted in the description which will follow.

It consists essentially in a treatment of at least two stages by ultrafiltration. On this subject, it is suitable to note that in the prior art, reverse osmosis was utilized and it is important to stress the differences between ultrafiltration and reverse osmosis.

Ultrafiltration assures a selective fractionation of the constituents at the molecular level corresponding to the desired end. To establish these concepts, according to the present process, one will utilize preferably membranes in which the cutoff point is situated at around a molecular weight of 15,000 to 25,000.

By contrast, in reverse osmosis, one essentially separates water from a product, as a concentrate containing practically all of the elements having a high molecular weight, in a liquid mass. Reverse osmosis membranes are much finer than those of ultrafiltration, and the cutoff point is approximately around a molecular weight on the order of 100, for example. Furthermore, ultrafiltration only requires pressures clearly lower than those of reverse osmosis. For example, one operates in ultrafiltration at about 4 kg/cm$^2$ whereas in reverse osmosis one works at about 12 kg/cm$^2$.

According to the process, following a conventional pressing step, one separates the pulp from a primary juice known as raw juice. Then one measures the pH and one adjusts the temperature, next one passes the primary juice to a first stage of ultrafiltration which separates the clear primary juice from pectic raw concentrate. One can dilute the latter if needed, for example with water or with clear juice, according to possibilities left to local law. It is passed at least to a second stage of ultrafiltration which at least separates a second clear juice rich in sugar and in aroma which is eventually added to the primary, and the pectic concentrate because it is at these stages ulterior to the ultrafiltration, which one is going to separate and concentrate having all that is at a molecular weight above 15,000 to 25,000, for example 20,000, that is to say essentially the proteins, the pectins, the starches and a part of the tannins. Preferably, the pressure of the introduction to the ultrafiltration is regulated within the range of 3 to 5 kg/cm$^2$ and the pressure at the exit within the range of 1 to 2 k/cm$^2$.

Experience shows that the juices of fruits and vegetables darken with time notably during transport and storage. This is due to reactions including Maillard reactions and oxidations. Now, according to the present process, one obtains juices which are very clear and only darken slightly, due to the elimination of the proteins which are indispensible to the Maillard reactions and because the contacts with air are very limited.

Furthermore, according to the present process, one does not resort, for clarification, to the traditional addition of gelatin of which the important percentage in soluble proteins reinforces the tendency toward darkening in the presence of sugars.

Moreover, according to the present process, the juices are obtained sterile, and do not have the tendency to ferment.

It is this which notably permits avoidance of the successive pasteurizations which are indispensible in the conventional processes, because according to the present process, the bacteria remain in the retained portion separated out.

This difference is even more clear with certain products such as red beets which, charged with dirt, introduce a great amount of bacteria spores which are difficult to destroy by heat treatments.

Moreover, still for the beets, one is obligated to effectuate three pasteurizations at higher than 90° C. which destroys each time 10% of the coloring power.

This problem is found again with other fruits having intense color. The present process provides a remarkable solution to this problem.

Another advantage of the present process is completely remarkable in the treatment of certain fruits: for example, strawberries contain natural polypeptide gelation agents which are eliminated by the ultrafiltration. In the conventional process, one is hindered by untimely gelations of the concentrate. The present process presents analogous advantages for certain products which become oxidized very fast, notably during the centrifuge treatment which augments the surface of contact between the products and oxygen in the air. In eliminating the centrifugation, the present process reduces the amount of air introduced into the product and thus the risks of oxidation.

In order to make better understood the characteristic techniques and the advantages of the present invention, examples of the operation will be described, having understood that these are not limitative as to their method of operation and as to the applications to which one can put the invention.

EXAMPLE 1

In taking as an example the treatment of apple juice, according to a process conforming to the present invention, one begins by a pressing operation as in all of the conventional type processes, permitting separation of the raw juice from the pulp. One will then subject the juices to a heating to temperatures on the order of 50° to 60° C. but more precisely and preferably, to a temperature on the order of 57° to 59° C., the pH being controlled between 3.5 and 4. Although it is not generally necessary, one can call upon, for correction of the pH, all adequate conventional additives which are authorized, but according to a preferred mode of realization of the invention, this correction is avoided by varying the temperature as a function of pH. The juice is passed to ultrafiltration, preferably on tubular membranes of which the point of cutoff corresponds to a molecular weight of 15,000 to 25,000, for example, on the order of 20,000.

It may be remarked on the subject of this ultrafiltration that, to obtain the best results, if the pH is below 3.5 (for example 3.3) it is necessary to increase the temperature for example to 62° C. If, to the contrary, the pH is too high, it is necessary to bring the juice to a lower temperature: for a higher pH (for example on the order of 4.2), one reduces the temperature for example to 56° C.; one thus does not have to rectify the pH to adjust it between the limits of 3.5 to 4 while remaining between the range 50° to 65° C. If the pH is 3.8 one is thus in the desired zone and one rests at 58° C.

One can apply a rule which takes sensible account of the numbers obtained experimentally.

T°C.= −6 pH+80° C. (to within about ±3° C.), which gives the following results:

| Ph | 3 | 3.5 | 4 | 4.5 |
|---|---|---|---|---|
| T° C. Average | 62° C. | 59° C. | 56° C. | 53° C. |
| T° C. ± 3° C. | 59–65° C. | 56–62° C. | 53–59° C. | 50–56° C. |

This rule is limited at the same time by the pHs imposed by nature and by the temperatures imposed by nature but equally by the maximum temperatures eventually imposed by the membranes utilized.

It is obligatory to retain a maximum temperature of 65° C. and possibly 62° C. with a number of membranes actually available on the market. This temperature constraint actually tends to disappear with the utilization of metallic material or other porous materials having a determined porosity, for the ultrafiltration.

A person skilled in the art will be able to utilize all types of conventional apparatus for regulation, either automatic or not, to adjust the temperature as a function of measured pH according to the formula defined above. When one treats products containing materials in suspension, in the actual condition of the technique, planar membranes present grave inconvenience, notably from the point of view of clogging between parallel surfaces compared to tubular membranes. Utilization of tubular membranes presents a greater space and a greater linear speed of circulation of fluids, one reduces the risk of clogging and correspondingly the frequency of cleaning.

As it was defined in the French patent application and to fix the concepts, if one wants to treat about 20,000 liters per hour of raw juice from the pressing of apples, about 150 m$^2$ of membrane for the first stage ultrafiltration is necessary, distributed for example in three modules. One collects at the exit of one part a clear primary juice and from another part a pectic raw concentrate. This primary concentrate eventually rediluted passes through a second stage of ultrafiltration still preferably on tubular membranes, but on a surface reduced to about a third of that of the first stage which permits at least partial desugaring of the concentrate which gives a second clear juice and a second retained portion more concentrated from which it is easy to remove the pectins using a filter press and drying or any other treatment necessitated by the separation of the pectins. One may, if authorized by the regulations case by case, recombine the two clear juices which yields a total clear juice. Each one of the two juices or the clear total juice does not need to be pasteurized and one can concentrate them by any adequate method. According to the regulations, the primary juice and/or the second juice and/or the total juice can be stored for utilization as is (bottling) or concentrated.

It has been established that by this process and in the case of the described example, the unusable sediments extracted are reduced by about half, or about 75 kilograms per ton of fruit as compared with 150 kilograms conventionally, without losing any of the pectins and other recoverable products, improving the production yield of juices with important energy economies.

EXAMPLE 2

The clarification of red beet juice by ultrafiltration in accordance with the invention is particularly interesting because these products are generally highly charged with spores of anaerobic bacteria from the ground and which are particularly difficult to destroy by heat. According to the prior art, three or four pasteurizations at higher than 120° C. are necessary to obtain a liquid not containing more than 100 germs per millimeter.

Now, it is known that each thermal-shock and thus each pasteurization at temperatures of 70° C. and higher causes the destruction of 15 to 20% of the red pigments which can include more than 50% destruction.

If one refers to the conditions described above, the pH of the red beet juices being on the order of 3.8 to 4.2, the optimum temperatures (as to output) are thus within the range between 57.2±3° C. and 54.8±3° C. Experience shows that one obtains good outputs between 55° and 59° C. but that it is desirable, to avoid overheating and destruction of pigments to work between 55° and 57° C.

If the pressure at the introduction to the ultrafiltration is regulated at 4 kg/cm$^2$ and the pressure at the exit at 1.5 kg/cm$^2$, the output in clear juice at the exit per square meter of membrane and per hour is on the order of 100 to 120 liters per m$^2$ per hour, the strongest output (110 to 120 liters per m$^2$ per hour) being attained near 57° to 59° C. at the introduction of the raw juice and the weakest (100 to 110 liters per m$^2$ per hour) near 55° to 57° C., the pigmentation being then better conserved.

EXAMPLE 3

One may also work under conditions defined by Example 1 and at pressures indicated above, but in reducing the temperature of introduction of the raw juices to 35° to 40° C. A remarkable quality of filtered products notably in terms of pigmentation has thus been obtained, but the output of clear juice falls to 60 to 70 liters per m$^2$ per hour which remains superior to the outputs of the prior art.

EXAMPLE 4

The prior art has demonstrated that the concentration of beet juices is limited by the proportion of sugar which is from 4° to 6° Brix. The same is true then for the pigment concentration is the concentrates. By previous fermentation by yeast, the proportion of sugar is reduced by 50 to 80%. It is then possible by ultrafiltration according to the present invention to obtain a considerable improvement of the pigmentation of the clear juices in acting as stated in Example 1 or 2 above.

With reference to the combination of Examples 2 to 4, it is suitable to make the following remark: according to the prior art, after fermentation, to separate the yeasts, it was necessary to utilize clarifiers/centrifuges which led to a loss of pigment by oxidation caused by the liquid-air mingling, and a loss of juice in the sediments on the order of 6 to 8% based on the volume treated. After centrifugation, it was necessary to filter and pasteurize at a high temperature (to 120° C.) to destroy a maximum of germs. Thanks to this invention the juices which were or were not previously fermented, are bacteriologically clean upon exit from the ultrafiltration. The bacteriological controls at the exit show that an average of less than 10 germs total per millimeter remain, as compared with 50,000 after the first pasteurization.

Ultrafiltration of red beet juice thus permits in Examples 2 to 4:
1. to obtain a clear liquid which is bacteriologically clean,
2. to reduce, indeed to cancel, the consecutive losses of pigments due to thermal treatments.

EXAMPLE 5

With reference to strawberries, one can begin with fresh or defrosted fruits. These are crushed into a puree and introduced into a cleaner-decanter to eliminate achenes, stalks and other impurities, but without the requirement of passage through a settling apparatus.

The raw strawberry juices are acid at a pH of 3.3 to 3.6 and present from 5.6° to 7° Brix according to the varieties and the maturity of the fruits. The clarification by ultrafiltration can be effectuated by various means according to the fruits to be treated and the color of concentrate desired. Certain varieties have juice which oxidizes rapidly which is changed by turning from red towards a brown and more and more darkened with the aging. This browning is even more rapid if the juice is heated in the presence of oxygen (and thus air).

According to the present example, strawberries are treated in the following fashion so that the coloration is only slightly sensitive to oxidation and for which less importance is attached to the final pigmentation of the concentrate.

One operates as in Example 1. The temperature of introduction corresponding to a pH of 3.3 to 3.6 is thus from 60.2±3° C. to 48.4±3° C. if for instance rounding off to 55° to 63° C. As for beets, these temperatures give good results, the highest giving a better output, the lowest a better coloration and here at pressures of 4 kg/cm$^2$ at the introduction point and 1.5 kg/cm$^2$ at the exit as was already utilized above.

For temperatures between 55° and 57° C., outputs have been established from 80 to 90 liters per m$^2$ per hour, which is still far superior to the prior art. At the exit, the clear juice which is well colored and bacteriologically clean can be pasteurized at 85° C. before concentration.

EXAMPLE 6

Still at the same pressures at the introduction point and exit, and for the same pH's considered, one can ultrafiltrate the raw juice such as that prepared in Example 5 at a lower temperature as in Example 3 for the red beet. The output is on the order of 60 liters per m$^2$ per hour which is still acceptable as compared to the prior art, but the quality of clarity and pigmentation is exceptional. The juice is bacteriologically clean and one can pasteurize it at 85° C. before concentration.

With respect to Examples 5 and 6, it may be remarked that the puree of strawberries is not subjected to a settling step before ultrafiltration which reduces the losses of juice.

The concentrated juices are always clear and are not disturbed by storage as is the case in the prior art. Moreover, as was stressed in the primary portion of this application, with certain varieties of strawberries and according to their maturity, the concentrate can become gelated when it is prepared according to the prior art and it is very difficult to prevent this gelation which is not caused by pectins and against which enzymes actually cannot be used effectively.

The ultrafiltration according to the present invention eliminates completely the gelation agents and consequently such accidents in the preservation. In all cases, it is established that the present invention assures a better conservation of the aroma than the conventional processes.

All that was said with respect to the red beets and strawberries can be applied to other fruits for which one desires to preserve the pigmentation. For example, in the case of black currants, one can operate as stated in Examples 4 and 5 and obtain equivalent results as those obtained for strawberries.

The process described above may be applied to a great number of plants, and in particular, fruits and legumes and it is evident that the man skilled in the art will be able to adapt the conditions of operation according to the primary starting materials, the present invention covering at the same time the process and the products obtained. If permits not only to recover the pectins as in the case of the apple, but also of a great number of constituents susceptible to valorization and in particular of the colorants.

It may also be remarked that according to the present invention, one may or may not remix the clear juices derived from the two stages of ultrafiltration as has been stressed earlier. The problem depends on many legal factors.

According to the regulatory plan, and to fix the concepts, the example of France will be given. Dilution by water is illegal except in the case of very pulpy juice such as that of pears or apricots which, in the natural state, are more like purees than drinks, and which one may extend by water and sugar in order to commercialize them under the name nectar.

In this case, the mixture of the clear juices is possible. One may also dilute between the two stages of ultrafiltration with clear juice which does not contain any exterior constituents.

But it is evident that the man skilled in the art will be able to choose the functional conditions of the primary starting materials and of the products which he proposes to obtain.

It is equally evident for the man skilled in the art that he will be able to vary the conditions of ultrafiltration contemplated, notably taking account of the texture of the different products and that eventually, he will be led to increase the number of stages of ultrafiltration.

Thus, for example, in the case of three stages of ultrafiltration, one can foresee a dilution of the concentrate between the first and the second stages, between the second and the third or between the two intervals, between the three stages.

All the same, in this case, one may or may not add at least one of the later clear juices to at least one of the preceeding clear juices.

We claim:

1. A process for the production of clear juices from plants and for the recovery of a pectic concentrate containing valorizable constituents comprising the steps of
    (a) adjusting the temperature of a raw juice, obtained by pressing, as a function of measured pH of the raw juice according to the formula T° C. = —6 pH + 80° C. ± about 3° C.;
    (b) subjecting the temperature-adjusted raw juice to ultrafiltration on a membrane to yield a primary clear juice and a primary retained pectic concentrate containing valorizable constituents;
    (c) subjecting said primary retained pectic concentrate to a second ultrafiltration on a membrane to yield a second clear juice and a second retained pectic concentrate containing said valorizable constituents;
    (d) conducting at least one of the ultrafiltrations on a membrane having a cutoff level of molecular weight on the order of 15,000 to 25,000; and
    (e) recovering said second retained pectic concentrate containing said valorizable constituents.

2. The process according to claim 1 wherein said raw juice contains pigments and the adjusted temperature of said raw juice is below a temperature which causes deterioration of said pigments in said juice.

3. The process according to claim 1 wherein at least a portion of the second clear juice is added to the primary clear juice.

4. The process according to claim 1 wherein the primary retained pectic concentrate is diluted before the second ultrafiltration.

5. The process according to claim 1 wherein the raw juice is subjected to a previous fermentation before ultrafiltration.

6. The process according to claim 1 wherein the process is carried out at least in one ultrafiltration under a pressure at the introduction and a pressure at the exit on the order respectively of 3 to 5 kilograms per cm$^2$ and of 1 to 2 kilograms per cm$^2$.

7. A process for the production of clear juices from plants and for the recovery of a pectic concentrate containing valorizable constituents comprising the steps of
    (a) adjusting the temperature of a raw juice, obtained by pressing, as a function of measured pH of the raw juice according to the formula T° C. = —6 pH + 80° C. ± about 3° C.;
    (b) subjecting the temperature-adjusted raw juice to ultrafiltration on a membrane to yield a primary clear juice and a primary retained pectic concentrate containing valorizable constituents;
    (c) subjecting said primary retained pectic concentrate to a second ultrafiltration on a membrane to yield a second clear juice and a second retained pectic concentrate containing said valorizable constituents;
    (d) conducting at least one of the ultrafiltrations on a membrane having a cutoff level of molecular weight on the order of 15,000 to 25,000;
    (e) recovering said second retained pectic concentrate containing said valorizable constituents; and
    (f) conducting said second ultrafiltration in the absence of added water.

* * * * *